W. C. NUTT.
POWER TRANSMISSION.
APPLICATION FILED FEB. 17, 1920.
1,353,063.
Patented Sept. 14, 1920.
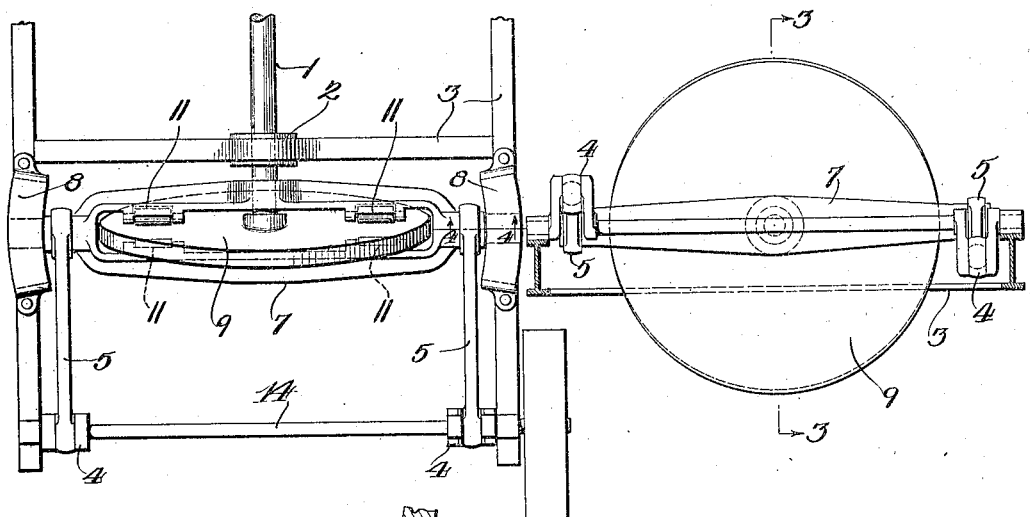
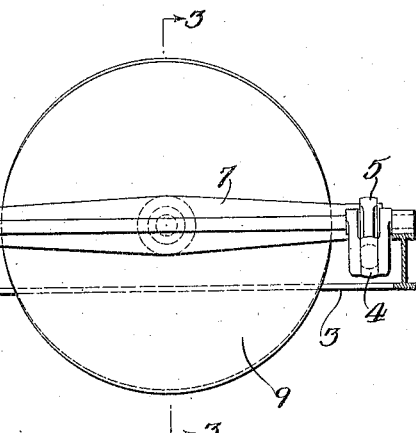
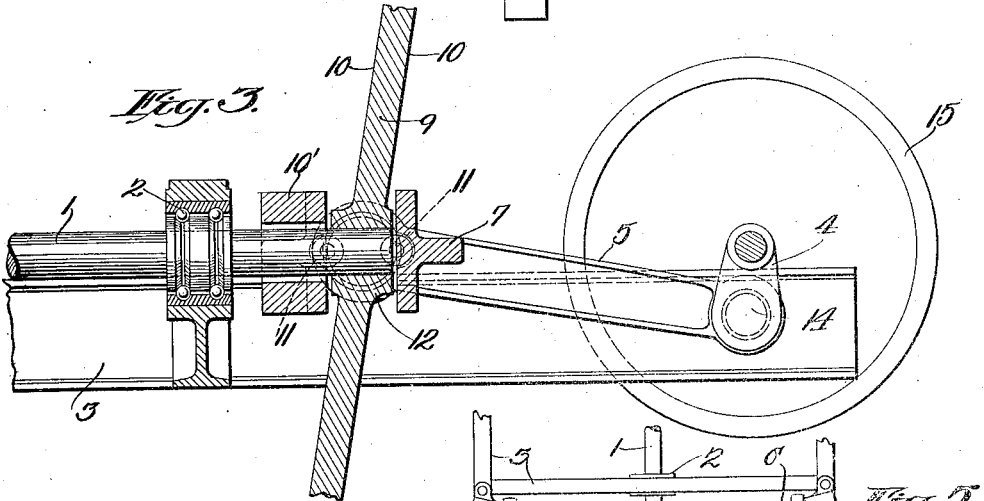
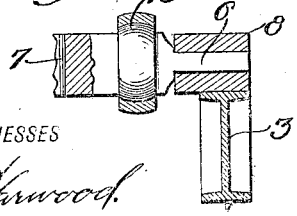
WITNESSES
INVENTOR
W. C. Nutt.
BY
ATTORNEYS

UNITED STATES PATENT OFFICE.

WILLIAM C. NUTT, OF POINT MARION, PENNSYLVANIA.

POWER TRANSMISSION.

1,353,063.

Specification of Letters Patent.  Patented Sept. 14, 1920.

Application filed February 17, 1920. Serial No. 359,355.

*To all whom it may concern:*

Be it known that I, WILLIAM C. NUTT, a citizen of the United States, and a resident of Point Marion, in the county of Fayette and State of Pennsylvania, have invented a new and Improved Power Transmission, of which the following is a full, clear, and exact description.

This invention relates to improvements in power transmission, an object of the invention being to provide improved mechanism for transmitting motion from a drive shaft to a crank shaft at right angles thereto.

A further object is to provide an improved cam wheel and oscillating frame with rollers on the frame engaging the face of the cam wheel and compelling the movement of the frame due to the changing angular disposition of the cam wheel.

With these and other objects in view the invention consists in certain novel features of construction, and combinations and arrangements of parts as will be more fully hereinafter described and pointed out in the claims.

In the accompanying drawings—

Figure 1 is a top plan view;

Fig. 2 is an end view;

Fig. 3 is an enlarged view in section on the line 3—3 of Fig. 2;

Fig. 4 is an enlarged detail view on the line 4—4 of Fig. 1; and

Fig. 5 is a diagrammatic plan view.

1 represents a drive shaft having an enlarged anti-friction bearing 2 in a rigid supporting frame 3. 14 represents a driven shaft having a fly wheel 15 thereon and mounted in the frame 3 at right angles to shaft 1 and preferably having a pair of crank arms 4, 4, which are connected by links 5, 5, with trunnions 6, 6, on the ends of an oscillating frame 7. The trunnions 6, 6, are guided in their movement by curved guides 8, secured to frame 3.

On the end of the drive shaft 1 a cam wheel or disk 9 is secured and positioned at an angle other than a right angle relative to the shaft, so as to form cam faces 10 on opposite faces of the wheel.

The frame 7, above referred to, is positioned around the wheel 9 and has a bearing collar 10' on one side located around the shaft 1.

Rollers 11 are carried by the frame 7 and engage the faces of the cam wheel preferably adjacent the edge of the wheel and I preferably employ two of these rollers 11 at each side of the wheel although I, of course, do not limit myself to any particular number.

The wheel 9 is preferably made with a hub 12 located between the members of frame 7 which, together with the rollers 11, maintain the wheel and frame in proper spaced relationship at all times.

The links 5 and trunnions 6 are preferably connected by ball and socket joints 13 to compensate for the varying angular positions of the trunnions.

The operation is as follows: As the shaft 1 and cam wheel 9 revolve the frame 7 will be oscillated due to the changing angular disposition of the cam wheel, as shown in Fig. 5, and the links 5 will compel a turning movement of shaft 14 due to their connection with crank arms 4. As the engagement of the cam wheel and frame is due to the contact of rollers 11 with the faces of the cam wheel, friction will be reduced to a minimum and the maximum of power transmitted.

The crank arms 4 are oppositely disposed so that the oscillating frame through the medium of the links 5 exerts a continuous positive driving action on opposite sides of the crank shaft.

Various slight changes may be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A power transmission, comprising a drive shaft, a cam wheel secured at an angle to the shaft, a frame straddling the cam wheel, a driven crank shaft, and links connecting the crank shaft and frame.

2. A power transmission, comprising a drive shaft, a cam wheel secured on the drive shaft, a frame straddling the wheel, trunnions on the frame, guides for the trunnions, a crank shaft, and links connecting the trunnions and crank shaft.

3. A power transmission, comprising a drive shaft, a cam wheel secured at an angle to the shaft, a frame straddling the cam wheel, a driven crank shaft, links connecting the crank shaft and frame, and rollers on the frame engaging the faces of the cam wheel.

4. A power transmission, comprising a drive shaft, a cam wheel secured on the drive shaft, a frame straddling the wheel, trunnions on the frame, guides for the trunnions, a crank shaft, links connecting the trunnions and crank shaft, and rollers on the frame engaging the faces of the cam wheel.

5. A power transmission, comprising a drive shaft, a cam wheel secured at an angle to the shaft, a frame straddling the cam wheel, a driven crank shaft, links connecting the crank shaft and frame, rollers on the frame engaging the faces of the cam wheel, and said links having ball and socket joints with the frame.

6. A power transmission, comprising a drive shaft, a cam wheel secured on the drive shaft, a frame straddling the wheel, trunnions on the frame, guides for the trunnions, a crank shaft, links connecting the trunnions and crank shaft, rollers on the frame engaging the faces of the cam wheel, and said links having ball and socket joints with the frame.

WILLIAM C. NUTT.